United States Patent
Lai et al.

(10) Patent No.: US 7,210,917 B2
(45) Date of Patent: May 1, 2007

(54) TWO POSITION DOUBLE INJECTION MOLDING APPARATUS

(75) Inventors: Yat Kwong Lai, Mississauga (CA); Paul Matysek, Toronto (CA)

(73) Assignee: Mold-Masters Limited, Georgetown, Ontario (CA)

( * ) Notice: Subject to any disclaimer, the term of this patent is extended or adjusted under 35 U.S.C. 154(b) by 247 days.

(21) Appl. No.: 10/749,001

(22) Filed: Dec. 30, 2003

(65) Prior Publication Data

US 2005/0140053 A1 Jun. 30, 2005

(51) Int. Cl.
*B29C 45/16* (2006.01)

(52) U.S. Cl. .................. 425/130; 264/255; 264/328.7; 264/328.8; 425/468; 425/556; 425/570; 425/576; 425/577

(58) Field of Classification Search .............. 425/468, 425/576, 556, 130, 570, 577; 264/255, 328.7, 264/328.8
See application file for complete search history.

(56) References Cited

U.S. PATENT DOCUMENTS

| | | | |
|---|---|---|---|
| 3,807,920 A * | 4/1974 | Aoki | ........................ 425/130 |
| 4,381,275 A | 4/1983 | Sorensen | |
| 4,470,936 A | 9/1984 | Potter | |
| 4,657,496 A | 4/1987 | Ozeki et al. | |
| 4,803,031 A * | 2/1989 | Ochs et al. | ................ 425/809 |
| 5,094,603 A | 3/1992 | Gellert | |
| 5,135,377 A | 8/1992 | Gellert | |
| 5,223,275 A | 6/1993 | Gellert | |
| 5,589,130 A | 12/1996 | Takada et al. | |
| 5,766,651 A | 6/1998 | Massano | |
| 5,922,369 A * | 7/1999 | Yanagihara et al. | ........ 425/572 |
| 6,062,841 A | 5/2000 | Gellert et al. | |
| 6,322,738 B1 | 11/2001 | Sicilia et al. | |
| 6,398,537 B2 | 6/2002 | Matysek | |
| 6,551,093 B2 * | 4/2003 | Taha | ........................ 425/556 |
| 6,648,622 B1 | 11/2003 | Gellert et al. | |
| 6,655,945 B1 | 12/2003 | Gellert et al. | |
| 6,821,100 B2 | 11/2004 | Kroeger | |
| 6,936,199 B2 * | 8/2005 | Olaru | .................... 264/328.15 |
| 7,070,724 B2 | 7/2006 | Nakazawa | |
| 2004/0119200 A1 | 6/2004 | Gram | |

FOREIGN PATENT DOCUMENTS

| | | |
|---|---|---|
| EP | 0 936 046 A1 | 2/1999 |
| EP | 0 936 046 A1 | 8/2003 |
| EP | 1 338 398 A1 | 8/2003 |
| JP | 2102012 A | 4/1990 |
| JP | 9201850 A | 8/1997 |

* cited by examiner

*Primary Examiner*—Tim Heitbrink
(74) *Attorney, Agent, or Firm*—McDonnell Boehnen Hulbert & Berghoff LLP

(57) ABSTRACT

An apparatus and method for injection molding of molded products including a first cavity chamber for forming a seal liner, with the first cavity chamber having an outer edge, and a second cavity chamber for forming a shell, with the second cavity chamber having a center and being adjacent to the first cavity chamber. The injection molding apparatus and method also includes a first nozzle for a seal liner material positioned near the outer edge of, and in communication with, the first cavity chamber, and a second nozzle for a shell material positioned near the center of, and in communication with, the second cavity chamber. The injection molding apparatus and method further includes a mold core capable of being positioned in and moved between the first and second cavity chambers.

20 Claims, 14 Drawing Sheets

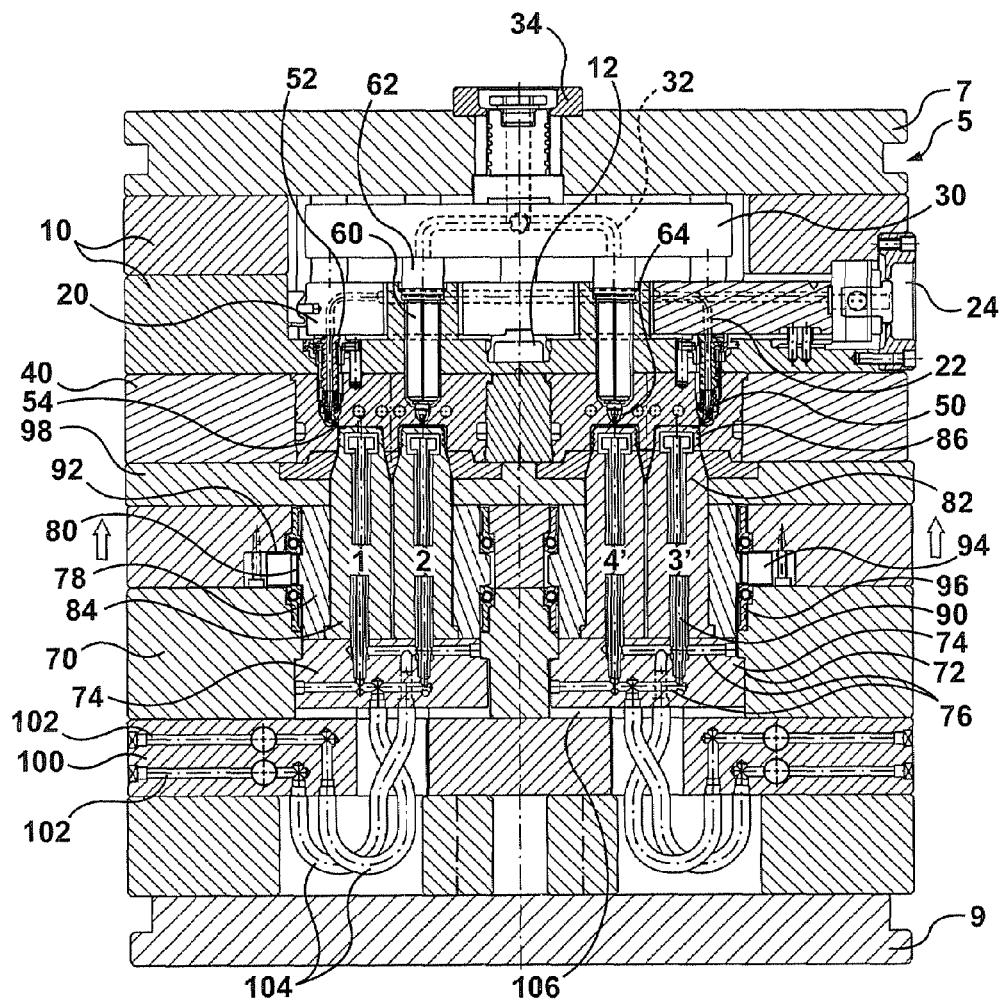
FIG. 1A
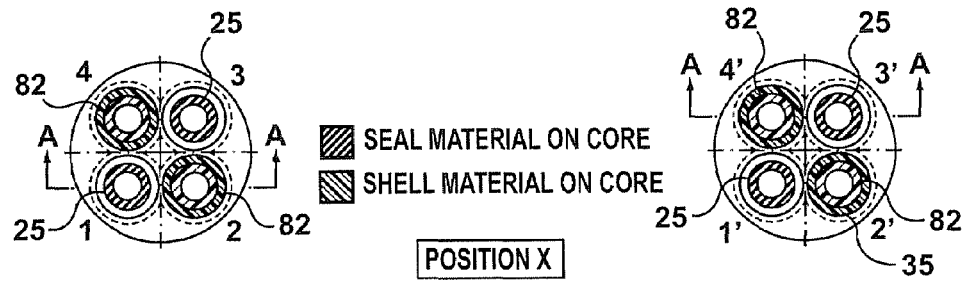
POSITION X
SEAL MATERIAL ON CORE
SHELL MATERIAL ON CORE
FIG. 1B          FIG. 1C

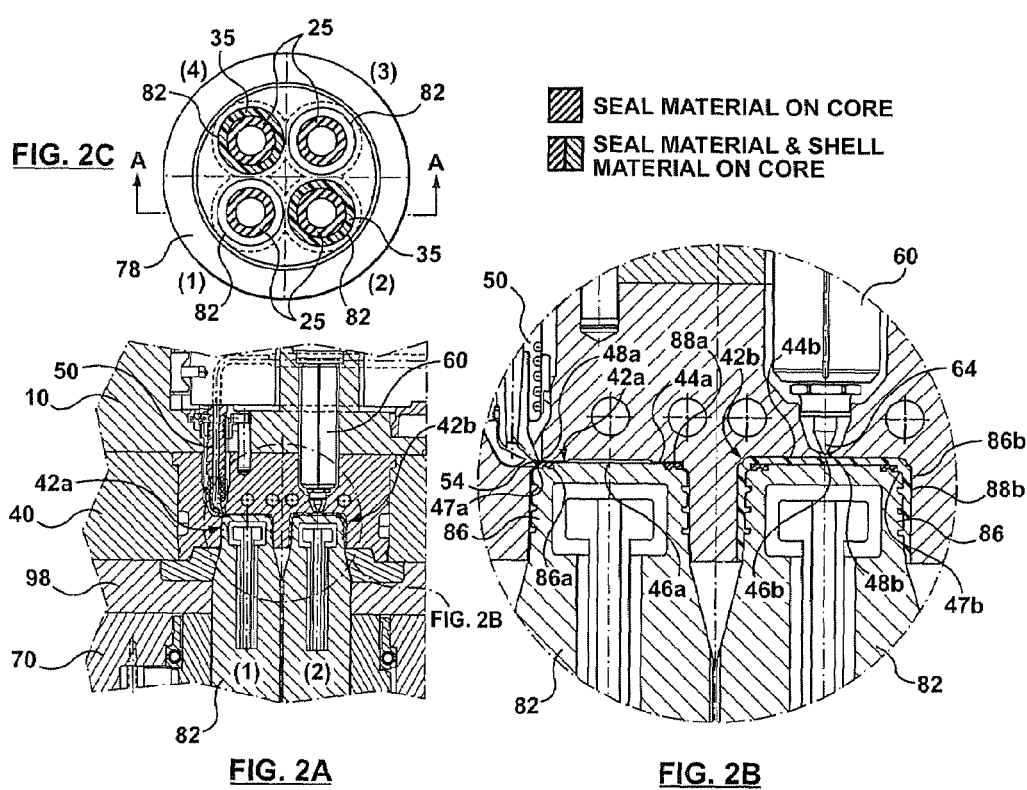

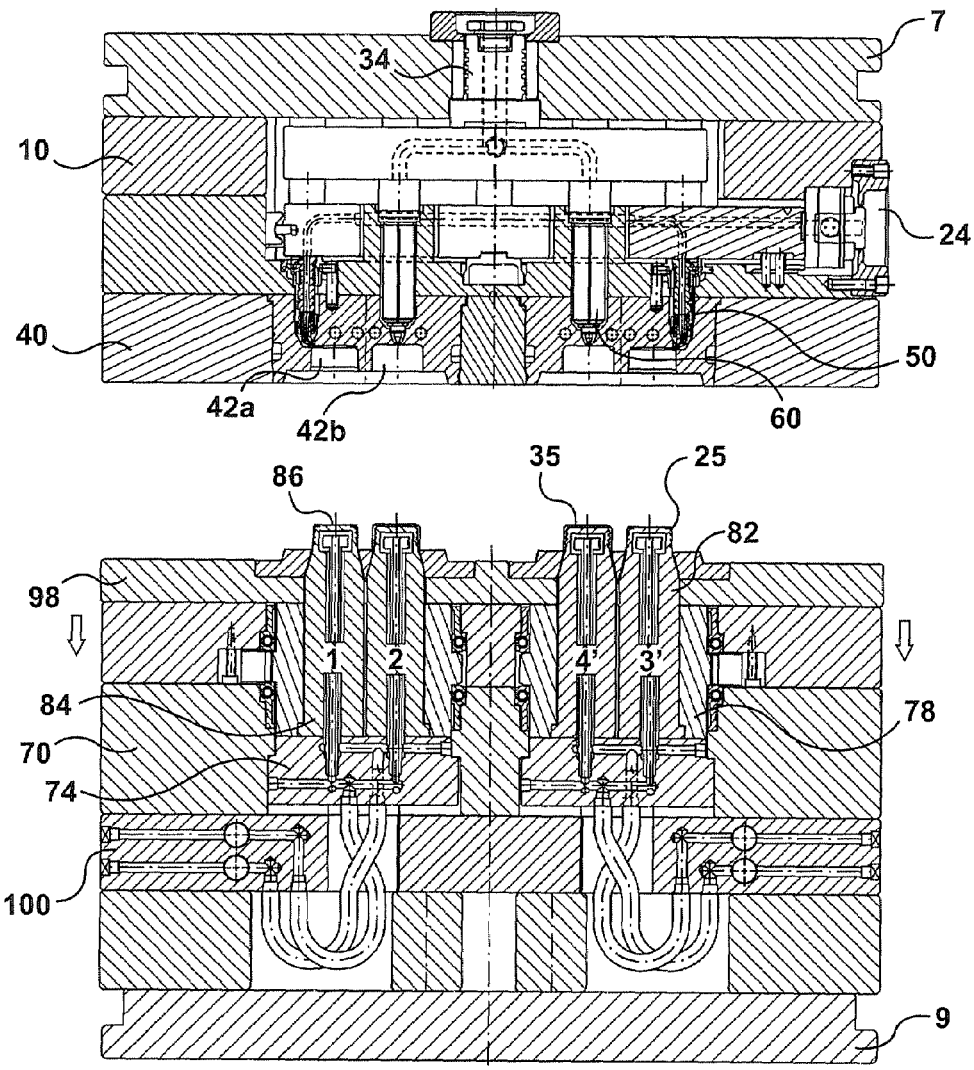
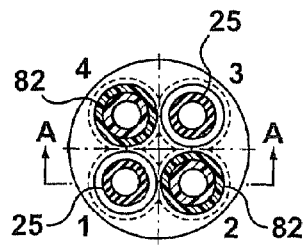
FIG. 3B
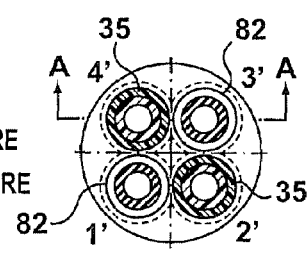
FIG. 3C
FIG. 3A

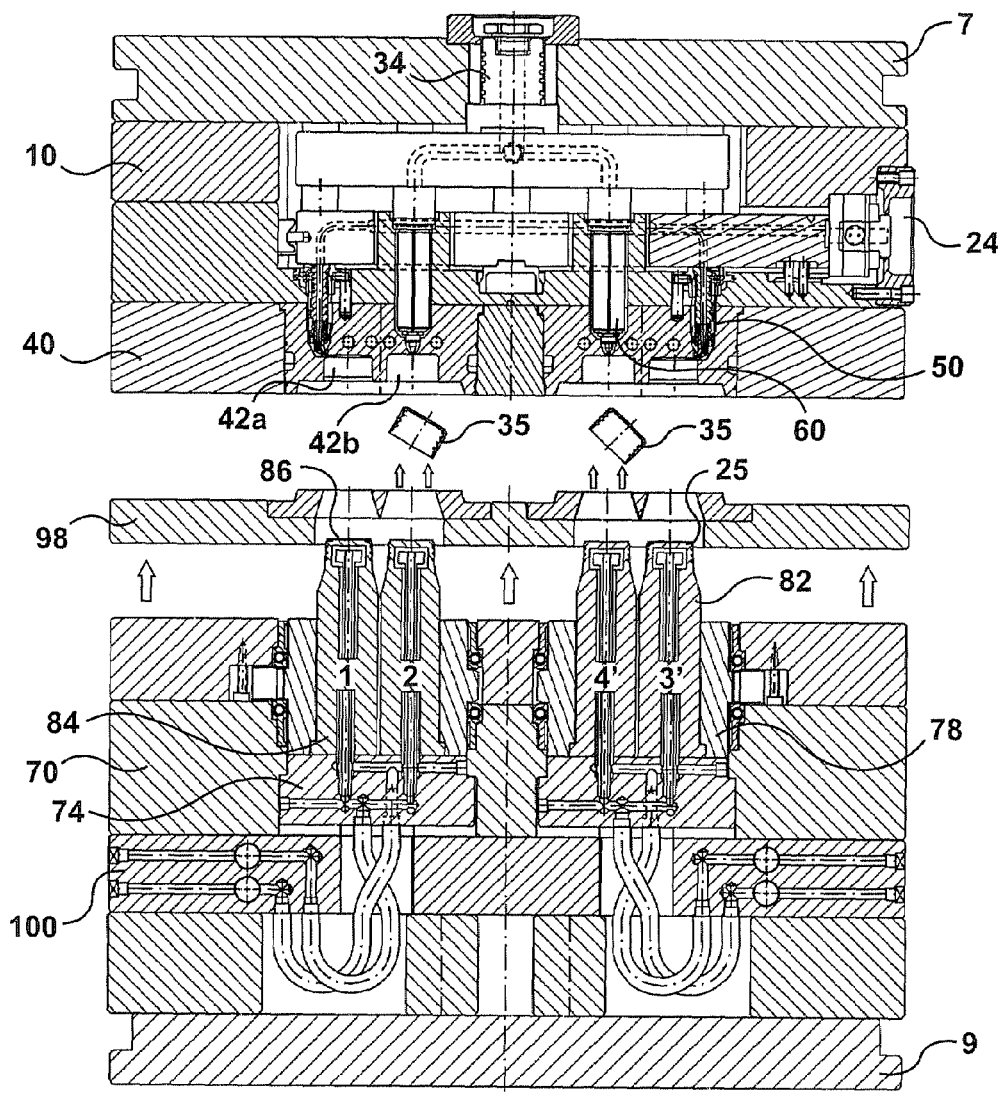
FIG. 4A
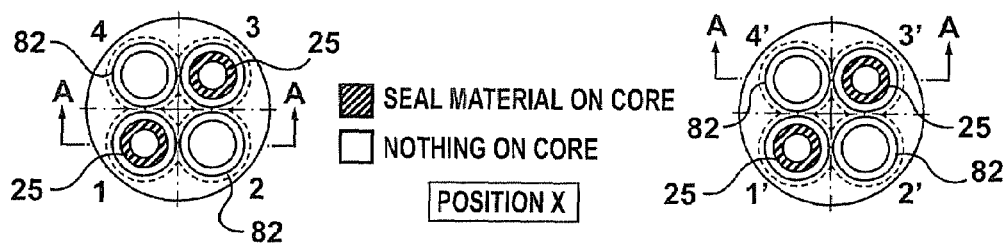
FIG. 4B  FIG. 4C

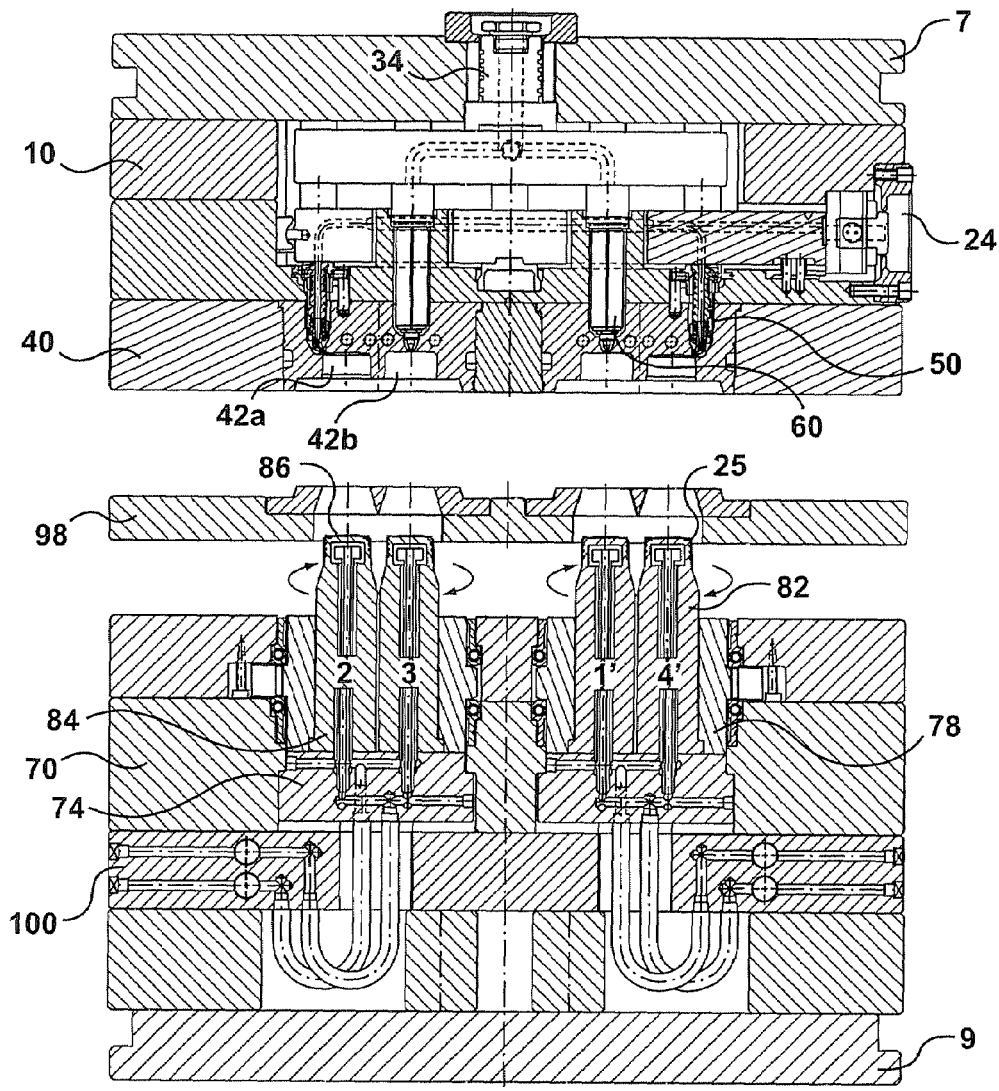
FIG. 5A
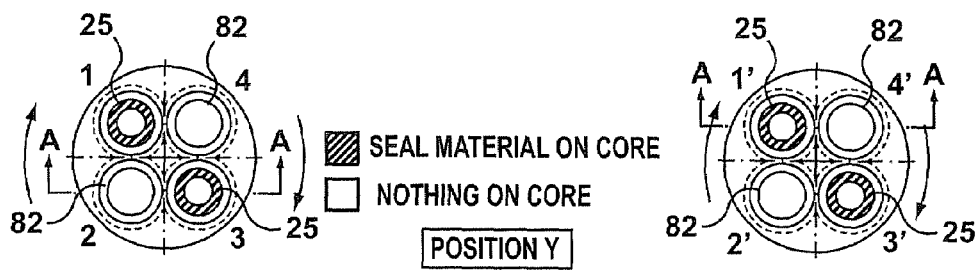
SEAL MATERIAL ON CORE
NOTHING ON CORE
POSITION Y
FIG. 5B
FIG. 5C

SEAL MATERIAL ON CORE

SEAL MATERIAL & SHELL MATERIAL ON CORE

POSITION X

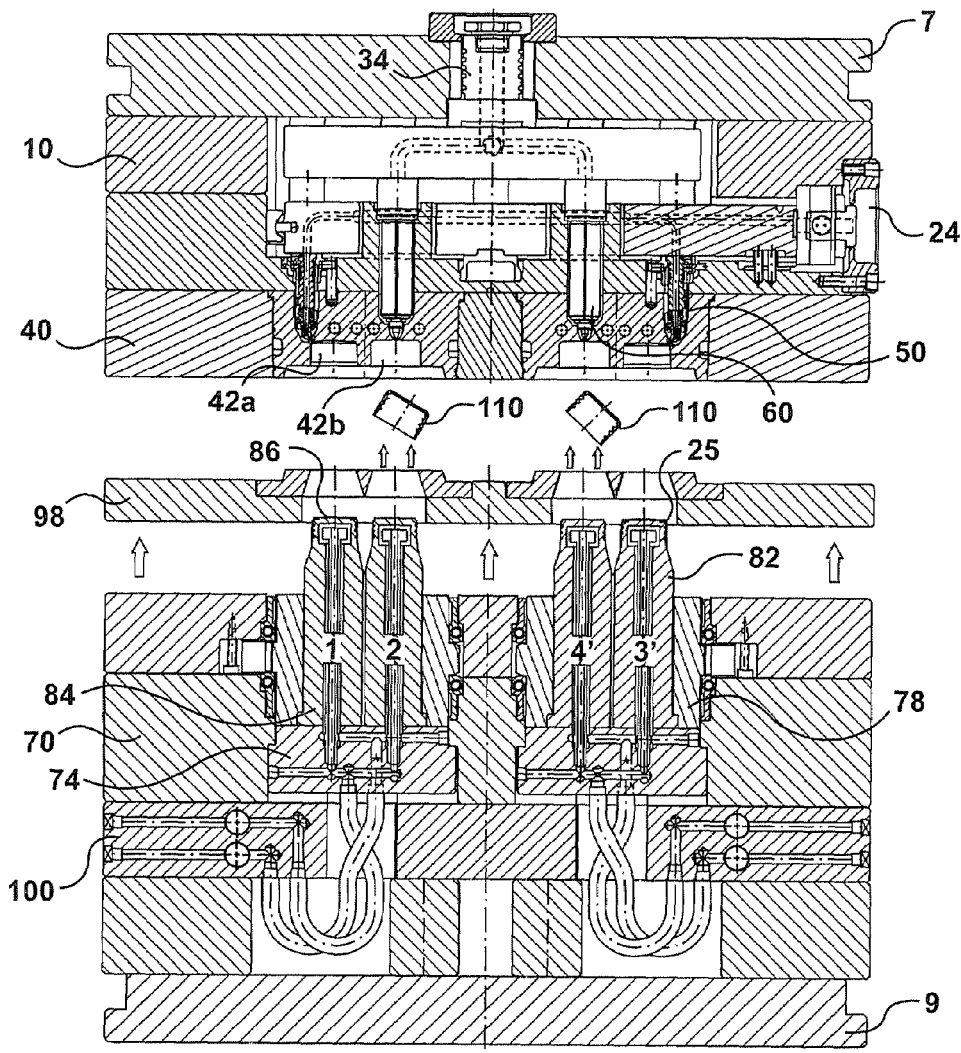
FIG. 12A
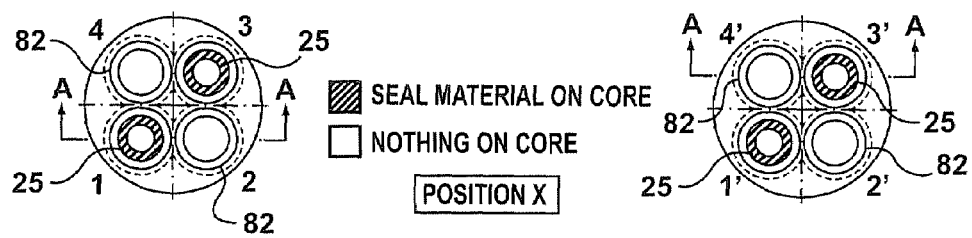
FIG. 12B     FIG. 12C

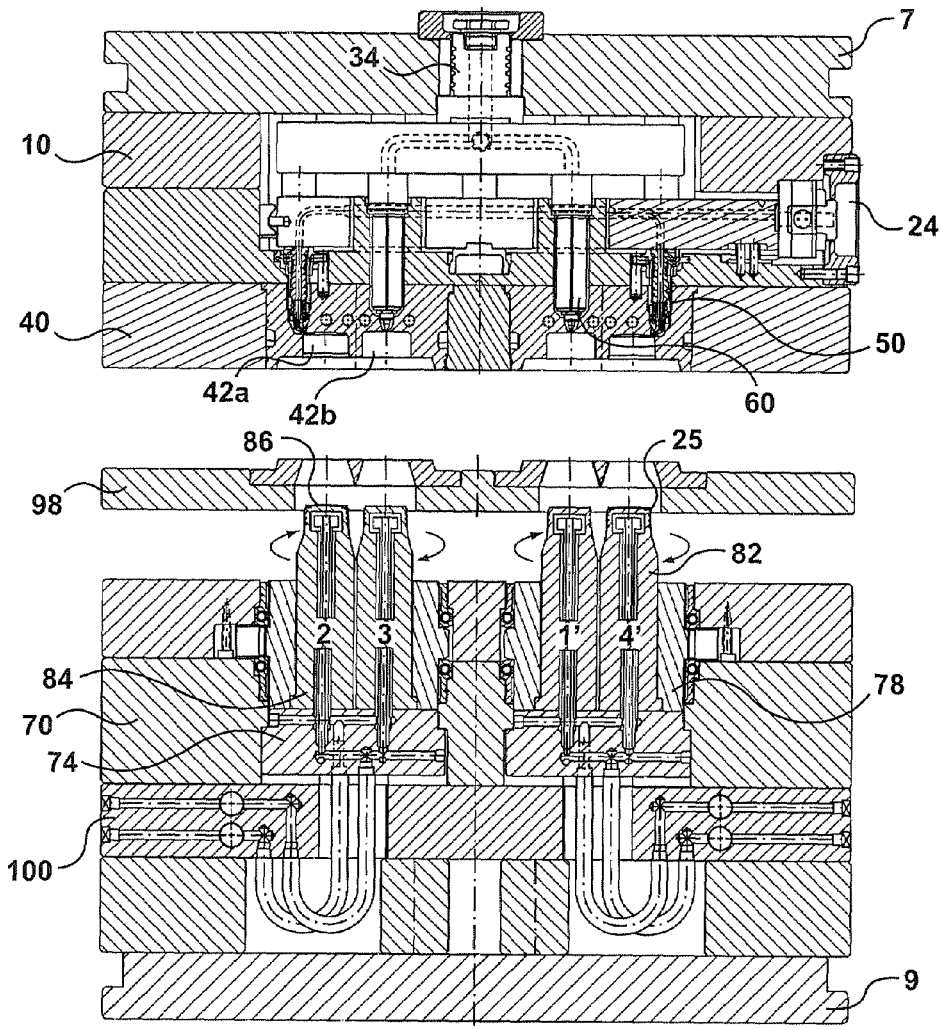
FIG. 13A
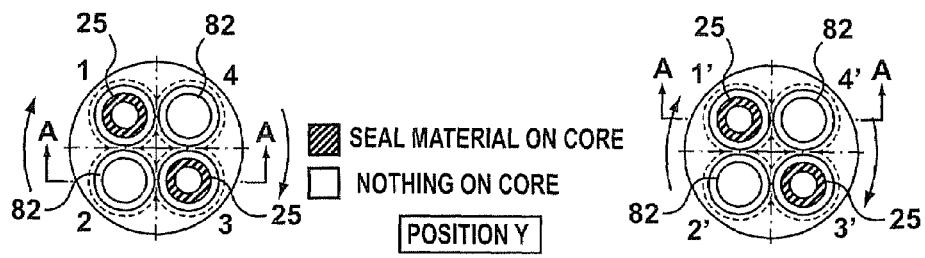
FIG. 13B
FIG. 13C

TWO POSITION DOUBLE INJECTION MOLDING APPARATUS

FIELD OF INVENTION

The present invention relates to a multi-cavity injection molding apparatus and method for making multi-layer, over-molded products. More specifically, it relates to an apparatus and method for two position, double injection molding of closures with integral seal liner and shell components.

BACKGROUND OF THE INVENTION

Multi-cavity injection molding apparatus for making single or multi-layer molded container products are well-known. One or more types of molten material are typically injected into a cavity from a nozzle aligned with the center of the cavity to form the molded product. If more than one molten material is used for overmolding (i.e., molding one material over another material), the first material must cool and solidify sufficiently in the cavity before the second material can be injected over the first material. Once all the molten material in the cavity has cooled enough to solidify, the injection molding apparatus is usually opened to eject the molded product from the cavity. In order to properly cool and solidify, however, all of the molten material must remain in the cavity aligned with the nozzle for a relatively lengthy period of time before the injection molding apparatus can be opened. In the case of overmolding, this period of time can become quite lengthy due to the fact that each material must be sufficiently cooled and solidified before introducing another material. As a result, the injection molding apparatus has to wait this same amount of time before the cavity can be refilled with new molten material to form a new molded product. This arrangement causes the injection molding apparatus of the prior art to have relatively high cycle or production times, especially with respect to overmolding devices.

Multi-cavity injection molding apparatus for making multi-layer closures for containers or bottles are also well-known. A barrier layer of one material is typically molded within a closure layer of another material. The barrier layer molded within the closure layer, however, does not provide a direct seal between the closure and its respective container or bottle. For example, U.S. Pat. No. 5,094,603 to Gellert, entitled "Thermal Valve Gated Injection Molding Apparatus With Melt Distribution Plate," issued on Mar. 10, 1992, commonly assigned with the present invention, and specifically incorporated in its entirety herein by reference, discloses a multi-cavity injection molding apparatus for making a two-layer closure with a barrier material molded within a closure material. While this invention has its advantages, since the barrier layer is formed within the closure layer, rather than adjacent to the closure layer's inner surface, an optimal direct seal is not provided between the closure and its respective container or bottle.

Injection molding of single-layer closures for containers or bottles is also well-known. To function properly, however, such closures usually require a second layer of a different material, namely a sealing layer. Typically, this sealing layer is a separate layer from the closure that is cut out of a sheet of sealing material and stamped or press-fit into a closure which was previously injection molded. These extra steps of cutting and stamping or press-fitting the sealing material, however, increase the time, labor, and cost involved with making the closure.

Alternatively, single-layer closures may be injection molded with an integral inner rim of the same material that helps provide a seal between the closure and its respective bottle or container. Adding the inner rim, however, involves using a more complex injection molding apparatus and process, thereby resulting in a more expensive closure. Moreover, the material used for the closure, and thus its inner rim, typically does not have as good of sealing ability as the sealing material used with the two separate layer closures described above.

Attempts have been made in the prior art to make closures with integral seal liner and shell components by injection molding a shell material over a seal liner material. An example of such an attempt is revealed in U.S. Pat. No. 4,803,031 to Ochs et al. Ochs et al. disclose an injection molding apparatus that utilizes two offset nozzles to inject sealing and shell materials into the same cavity chamber. In the Ochs et al. apparatus, the sealing material is injected from a first offset nozzle onto a mold core in a cavity chamber, and then cooled and solidified in the cavity chamber for a sufficient period of time. Next, the mold core of the Ochs et al. apparatus is dropped and backed away from the offset nozzles, and the shell material is injected from a second offset nozzle around and over the sealing material and mold core in the same cavity chamber to form the molded closure. The disadvantage of the Ochs et al. apparatus is that the seal liner and shell components are made in the same cavity chamber, one after the other, rather than simultaneously in separate cavity chambers. As a result of this design, the injection molding cycle or production times are greatly increased, thereby also increasing the time, labor, and cost associated with making closures.

Accordingly, it would be desirable to have an apparatus and method for injection molding that overcomes the problems associated with the prior art by implementing an efficient rotation or shuttling system between separate cavity chambers that reduces the overall cycle or production time for the products to be molded. In particular, it would be desirable to have an injection molding apparatus and method that allows for simultaneous molding of seal liner components and shell components over the seal liner components in separate cavity chambers to form integral, one-piece closures with improved sealing characteristics. In other words, it would be desirable to have an apparatus and method for injection molding a closure with an integral sealing layer, rather than the inner barrier layer, the separate sealing layer, or the inner rim taught by the prior art. Injection molding of a closure with an integral sealing layer would not only be relatively simpler and less expensive, but would also provide a closure with an improved seal between the closure and its respective bottle or container. It would also be desirable to use a rotation or shuttling system that can be readily implemented into standard injection molding apparatus, as opposed to specially designed injection molding apparatus.

SUMMARY OF THE INVENTION

The present embodiments provide an injection molding apparatus for molding products comprising a first cavity chamber for forming a seal liner, with the first cavity chamber having an outer edge, and a second cavity chamber for forming a shell, with the second cavity chamber having a center and being adjacent to the first cavity chamber. The injection molding apparatus also comprises a first nozzle for a seal liner material positioned near the outer edge of, and in communication with, the first cavity chamber, and a second nozzle for a shell material positioned near the center of, and in communication with, the second cavity chamber. The injection molding apparatus further comprises a mold core capable of being positioned in and moved between the first and second cavity chambers.

In addition, the present embodiments provide an injection molding apparatus for molding products comprising a first and a second seal liner cavity chamber for forming a seal liner, with the first and second seal liner cavity chambers each having an outer edge, and a first and a second shell cavity chamber for forming a shell over the seal liner. The first shell cavity chamber has a center and is adjacent to the first seal liner cavity chamber, while the second shell cavity chamber also has a center, but is adjacent to the second seal liner cavity chamber. The injection molding apparatus also comprises a first and a second offset nozzle for a seal liner material. The first offset nozzle is positioned near the outer edge of the first seal liner cavity chamber, and is also in communication with the first seal liner cavity chamber. The second offset nozzle is positioned near the outer edge of the second seal liner cavity chamber, is also in communication with the second seal liner cavity chamber. The injection molding apparatus further comprises a first and a second center nozzle for a shell material. The first center nozzle is positioned near the center of the first shell cavity chamber, and is also in communication with the first shell cavity chamber. The second center nozzle is positioned near the center of the second shell cavity chamber, and is also in communication with the second shell cavity chamber. Finally, the injection molding apparatus also comprises a first, a second, a third, and a fourth mold core, with the first mold core capable of being positioned in and moved between the first seal liner cavity chamber and the second shell cavity chamber, the second mold core capable of being positioned in and moved between the first shell cavity chamber and the first seal liner cavity chamber, the third mold core capable of being positioned in and moved between the second seal liner cavity chamber and the first shell cavity chamber, and the fourth mold core capable of being positioned in and moved between the second shell cavity chamber and the second seal liner cavity chamber.

Moreover, the present embodiments further provide an injection molding apparatus in combination with an injection molding machine having at least a first material and a second material, comprising a first cavity chamber for forming a seal liner, with the first cavity chamber having an outer edge, and a second cavity chamber for forming a shell, with the second cavity chamber having a center and being adjacent to the first cavity chamber. This combination also comprises a first melt distribution manifold having a first material melt passage connected to and in communication with a first material injection entry, and a second melt distribution manifold having a second material melt passage connected to and in communication with a second material injection entry. The first material injection entry is connected to and in communication with the first material of the injection molding machine, and the second material injection entry is connected to and in communication with the second material of the injection molding machine. The combination further comprises a first nozzle positioned near the outer edge of the first cavity chamber, and in communication with the first cavity chamber and the first material melt passage, as well as a second nozzle positioned near the center of the second cavity chamber, and in communication with the second cavity chamber and the second material melt passage. Finally, the combination also comprises a mold core capable of being positioned in and moved between the first and second cavity chambers.

Furthermore, the present embodiments provide a method for injection molding of products comprising the steps of moving a mold core into a first cavity chamber with an outer edge to form a seal liner cavity opening, and injecting seal liner material from a first nozzle positioned near the outer edge of the first cavity chamber into the seal liner cavity opening to form a seal liner on the mold core. The method also comprises the step of moving the mold core and the seal liner into a second cavity chamber with a center to form a shell cavity opening, wherein the second cavity chamber is adjacent to the first cavity chamber. The method further comprises the step of injecting shell material from a second nozzle positioned near the center of the second cavity chamber into the shell cavity opening to form a shell on the mold core and the seal liner.

BRIEF DESCRIPTION OF THE DRAWINGS

FIGS. 1A–1C (Stage 1) are a cross-sectional side view of an exemplary injection molding apparatus, and partial top views of mold cores of the injection molding apparatus of FIG. 1A, respectively, with the mold cores shown in FIG. 1A being indicated by the A—A lines of FIGS. 1B–1C.

FIGS. 2A–2C are partial cross-sectional side views of the injection molding apparatus of FIG. 1A, and a partial top view of the mold cores of the injection molding apparatus of FIG. 2A, respectively. FIG. 2B is an enlarged partial view of FIG. 2A, and the mold cores shown in FIG. 2A are indicated by the A—A line of FIG. 2C.

FIGS. 3A–3C (Stage 2) are a cross-sectional side view of the injection molding apparatus of FIG. 1A, and partial top views of the mold cores of the injection molding apparatus of FIG. 3A, respectively, with the mold cores shown in FIG. 3A being indicated by the A—A lines of FIGS. 3B–3C.

FIGS. 4A–4C (Stage 3) are a cross-sectional side view of the injection molding apparatus of FIG. 1A, and partial top views of the mold cores of the injection molding apparatus of FIG. 4A, respectively, with the mold cores shown in FIG. 4A being indicated by the A—A lines of FIGS. 4B–4C.

FIGS. 5A–5C (Stage 4) are a cross-sectional side view of the injection molding apparatus of FIG. 1A, and partial top views of the mold cores of the injection molding apparatus of FIG. 5A, respectively, with the mold cores shown in FIG. 5A being indicated by the A—A lines of FIGS. 5B–5C.

FIGS. 12A–3C (Stage 11) are a cross-sectional side view of the injection molding apparatus of FIG. 1A, and partial top views of the mold cores of the injection molding apparatus of FIG. 12A, respectively, with the mold cores shown in FIG. 12A being indicated by the A—A lines of FIGS. 12B–12C.

FIGS. 13A–13C (Stage 12) are a cross-sectional side view of the injection molding apparatus of FIG. 1A, and partial top views of the mold cores of the injection molding apparatus of FIG. 13A, respectively, with the mold cores shown in FIG. 13A being indicated by the A—A lines of FIGS. 13B–13C.

DETAILED DESCRIPTION OF EXEMPLARY EMBODIMENTS

Figure 6A:
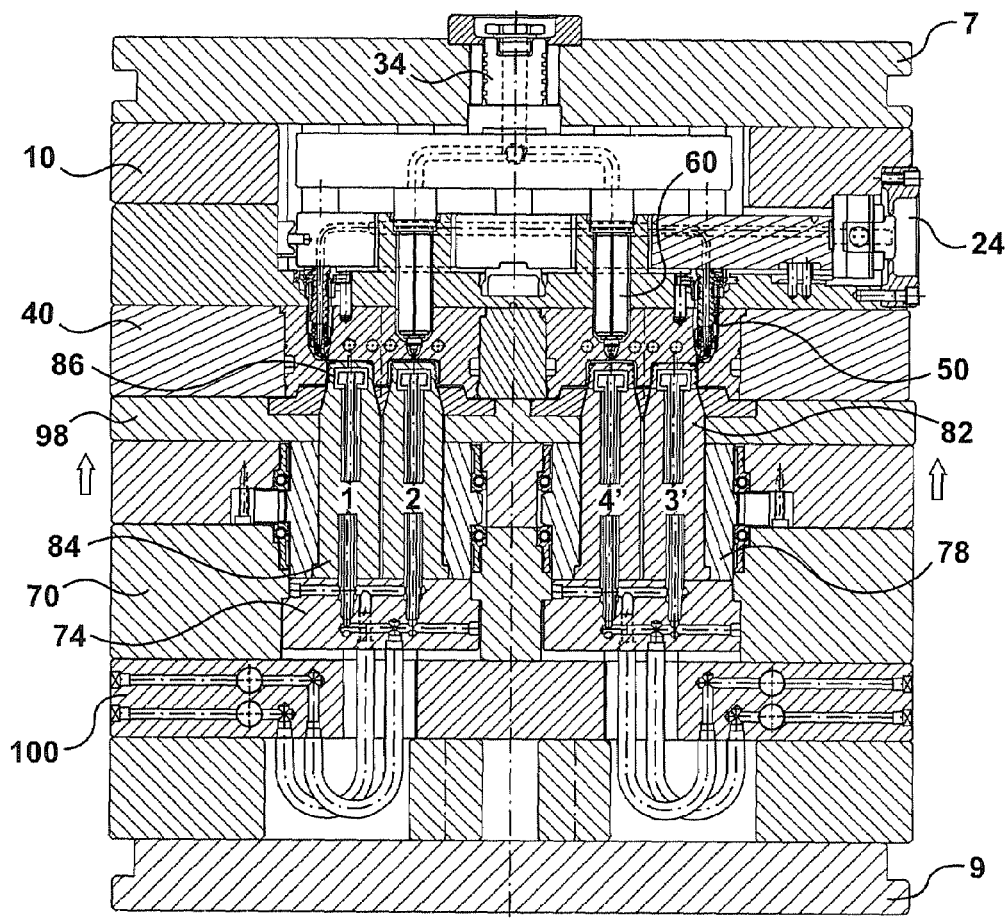
FIGS. 6A–6C (Stage 5) are a cross-sectional side view of the injection molding apparatus of FIG. 1A, and partial top views of the mold cores of the injection molding apparatus of FIG. 6A, respectively, with the mold cores shown in FIG. 6A being indicated by the A—A lines of FIGS. 6B–6C.

Turning now to the drawings, FIGS. 1A–1C and 2A–2C show an exemplary embodiment of an injection molding apparatus 5 for molding closures or other products by overmolding with or without sequential and/or simultaneous coinjection. The injection molding apparatus 5 comprises a first clamping plate 7, a second clamping plate 9 spaced from the first clamping plate 7, a manifold plate 10 with a manifold locator 12 positioned between the first and second clamping plates, adjacent to the first clamping plate, a cavity plate 40 positioned between the manifold plate and the second clamping plate, adjacent to the manifold plate, a core plate 70 positioned between the cavity plate and the second clamping plate, a stripper plate 98 positioned between the cavity plate and the core plate, and a support plate 100 positioned between the core plate and the second clamping plate, adjacent to the core plate. It should be understood, however, that the injection molding apparatus 5 may comprise more or less plates and/or have different plate arrangements, depending on manufacturing and/or consumer preferences.

The injection molding apparatus 5 also comprises a first melt distribution manifold 20 and a second melt distribution manifold 30 held by and positioned in the manifold plate 10 on the manifold locator 12. Preferably, but not necessarily, the second melt distribution manifold 30 is positioned between the first clamping plate 7 and the first melt distribution manifold 20, as shown in FIG. 1A. The first melt distribution manifold 20 has a first material melt passage 22 connected to and in communication with a first material injection entry 24, which in turn is connected to and in communication with at least a first material 25 of an injection molding machine (not shown). Similarly, the second melt distribution manifold 30 has a second material melt passage 32 connected to and in communication with a second material injection entry 34, which in turn is connected to and in communication with at least a second material 35 of an injection molding machine (not shown). Preferably, the first material 25 is a seal liner material, such as santoprene or ethylene vinyl alcohol ("EVOH"), and the second material 35 is a shell material, such as polyethylene terephthalate ("PET"), polypropylene, or nylon. It should be understood, however, that the first and second material injection entries 24, 34, as well as the injection molding machine, may be used for more than one material and many different types of materials. For instance, the second material injection entry 34 may be connected to two different shell materials of an injection molding machine for forming multi-layered shell components, as discussed in more detail below.

As shown in FIGS. 2A and 2B, the cavity plate 40 preferably has a plurality of seal liner cavity chambers 42a for receiving seal liner material 25, and a plurality of shell cavity chambers 42b adjacent to the seal liner cavity chambers 42a for receiving shell material 35. Each seal liner cavity chamber 42a preferably has a gate end 44a with a center 46a, an outer edge 47a surrounding the center 46a, and a gate opening 48a located at the outer edge 47a. Similarly, each shell cavity chamber 42b preferably has a gate end 44b with a center 46b, an outer edge 47b surrounding the center 46b, and a gate opening 48b located at the center 46b.

The injection molding apparatus 5 also comprises a plurality of offset nozzles 50 and a plurality of center nozzles 60 seated and positioned within the manifold plate 10 and the cavity plate 40, as shown in FIG. 1A. Each offset and center nozzle 50, 60 has a base 52, 62 and a tip 54, 64 opposite the base 52, 62, respectively, with the tip 54 of each offset nozzle 50 being preferably angled, as best shown in FIG. 2B. The base 52 of each offset nozzle 50 is preferably positioned against the first melt distribution manifold 20, while the base 62 of each center nozzle is preferably positioned against the second melt distribution manifold 30. As a result of this arrangement, each offset nozzle 50 is connected to and in communication with the first material melt passage 22 of the first melt distribution manifold 20, and each center nozzle 60 is connected to and in communication with the second material melt passage 32 of the second melt distribution manifold 30.

As shown in FIGS. 2A–2B, the tip 54 of each offset nozzle 50 is preferably connected to and in communication with the gate opening 48a of each seal liner cavity chamber 42a, and the tip 64 of each center nozzle 60 is preferably connected to and in communication with the gate opening 48b of each shell cavity chamber 42b. As a result of this arrangement, each seal liner cavity chamber 42a is connected to and in communication with the first material melt passage 22 through an offset nozzle 50, and each shell cavity chamber 42b is connected to and in communication with the second material melt passage 32 through a center nozzle 60. As described in more detail below, the first material 25 is therefore able to flow from the first material injection entry 24, through the first material melt passage 22 and the offset nozzles 50, and into the seal liner cavity chambers 42a, while the second material 35 is therefore able to flow from the second material injection entry 34, through the second material melt passage 32 and the center nozzles 60, and into the shell cavity chambers 42b.

Although only four nozzles 50, 60 are shown in FIG. 1A for ease of illustration, any desirable number of nozzles may be used with the injection molding apparatus of the present invention. Likewise, the nozzles 50, 60 may be arranged or located in different positions, and may be either sprue-gated, thermal-gated, or valve-gated, or any combination thereof. Preferably, but not necessarily, each offset nozzle 50 is thermal-gated, and each center nozzle 60 is valve-gated. It should also be understood that the nozzles 50, 60 may be used to inject more than one material, i.e., coinjection, sequentially or simultaneously into their respective cavity chambers 42a, 42b. For more information on coinjection, as well as sprue-gated, thermal-gated and valve-gated nozzles, see U.S. Pat. No. 6,062,841, U.S. patent application Ser. No. 09/271,835, entitled "Apparatus and Method For Multi-Layer Injection Molding," filed on Mar. 18, 1999, and U.S. Pat. No. 6,648,622, as well as U.S. Pat. Nos. 5,094,603, 5,135,377, and 5,223,275 to Gellert, which are all specifically incorporated in their entirety herein by reference.

As shown in FIG. 1A, the core plate 70 of the injection molding apparatus 5 of the present invention comprises a plurality of seat openings 72 for receiving and retaining a plurality of cooling manifold rings 74 with cooling ducts 76, and a plurality of core holders 78 with annular gears 80. The cooling manifold rings 74 and the core holders 78 are connected to and positioned against each other between the stripper plate 98 and the support plate 100. Both the cooling manifold rings 74 and the core holders 78 are rotatably mounted within the core plate 70 and thus free to rotate.

A plurality of mold cores 82 are also fixedly mounted within each core holder 78. Preferably, but not necessarily, each core holder 78 has four mold cores 82, numbered either 1, 2, 3, and 4, or 1', 2', 3', and 4', as shown in FIGS. 1A–1C. It should be understood that mold cores 1, 2, 3, and 4 are identical to mold cores 1', 2', 3', and 4', respectively, with the exception of their overall location in the injection molding apparatus 5. For ease of reference and illustration, only mold cores 1, 2, 3', and 4' are shown in FIG. 1A, as indicated by the A—A lines of FIGS. 1B–1C. A similar approach is used for FIGS. 3A–13C of the present application, with only the mold cores along the A—A lines of the B and C figures being shown in the A figures.

Each mold core 82 has a base 84 positioned against the cooling manifold rings 74, and an end 86 opposite the base 84. The end 86 of each mold core 82 has a groove-like, ring-shaped seal liner portion 86a, and a threaded, closure-shaped shell portion 86b over and around the seal liner portion 86a. When a mold core 82 is fully inserted into a seal liner cavity chamber 42a, the seal liner portion 86a and the seal liner cavity chamber 42a together form the seal liner cavity opening 88a, as shown in FIG. 2B. Likewise, when a mold core 82 is fully inserted into a shell cavity chamber 42b, the shell portion 86b and the shell cavity chamber 42b together form the shell cavity opening 88b, as shown in FIG. 2B. Each mold core 82 preferably also has a cooling channel 90 connected to and in communication with the cooling ducts 76 of the cooling manifold rings 74.

The seal liner and shell cavity openings 88a, 88b may have any number of shapes and configurations depending on the desired product to be molded. As shown in the figures of the present application, the seal liner and shell cavity openings 88a, 88b preferably, but not necessarily, have the shape of an annular ring-like seal liner and a threaded closure shell cap, respectively. It should be understood that by altering the seal liner and shell cavity openings 88a, 88b, one may mold other closure components of different shapes and configurations, or products different from closures, such as bottle preforms, and the present invention is not limited to the molding of only the closure and its components shown or even other types of closures.

As shown in FIG. 1A, the core plate 70 preferably has a plurality of grooves 92 and a plurality of racks 94 positioned within the grooves 92. In addition, the racks 94 are aligned and mesh with the annular gears 80 of the core holders 78. The racks 94 are also connected to a drive system (not shown), such as a hydraulic piston assembly, that is capable of driving the racks forward and backward against the annular gears 80 in order to rotate the core holders 78, and thus the connected cooling manifold rings 74 and mold cores 82, ninety degrees clockwise and counterclockwise. Preferably, a plurality of roller bearings 96 are positioned between the core plate 70 and the core holders 78 to help reduce friction between the two and facilitate the rotation of the core holders 78 within the core plate 70.

The stripper plate 98 of the injection molding apparatus 5 is positioned around the mold cores and is free to move toward the nozzles 50, 60 when the injection molding apparatus 5 is in the open position. As explained in more detail below, this arrangement and movement allows the stripper plates to strip and remove finished shell components from the mold cores 82 and the injection molding apparatus 5.

The support plate 100 of the injection molding apparatus 5 has a plurality of cooling passages 102 connected to and in communication with a source (not shown) for cooling fluids, such as cooled water or air. Each of these cooling passages 102 are also connected to and in communication with a flexible cooling conduit 104, which in turn is connected to and in communication with each of the cooling ducts 76 of the cooling manifold rings 74. The flexible design of the cooling conduits 104 enables them to twist back and forth upon rotation of the cooling manifold rings 74, so as not to hinder the rotation of the mold cores 82.

As shown in FIG. 1A, a wear plate 106 may be positioned between each cooling manifold ring 74 and the support plate 100 to help reduce damage and excessive wear to the cooling manifold rings 74 and the support plate 100 from rotational movement of the manifold cooling rings 74 during operation of the injection molding apparatus 5. Preferably, but not necessarily, the wear plate 106 is made out of a resilient, wear-resistant material, such as bearing bronze.

It should be understood that the exemplary injection molding apparatus 5, especially its nozzles, may also have one or more heating systems, cooling systems, and insulative air spaces to maintain the proper temperatures for its components and the materials flowing through the apparatus. Examples of suitable heating systems, cooling systems, and insulative air spaces for the apparatus of the present invention are described in U.S. Pat. No. 6,062,841, as well as U.S. Pat. Nos. 5,094,603, 5,135,377, and 5,223,275 to Gellert, which have all been specifically incorporated in their entirety herein by reference.

The operation of the injection molding apparatus 5 will now be described with reference to the drawings. In particular, each step of the method and operation of the injection molding apparatus 5, which will be referred to with a stage number, will be described with reference to FIGS. 1A–1C and 3A–13C. While the formation of only a closure is shown in the drawings and described below, it should be understood that other types of closures or products different than closures, such as bottle preforms, with varying material characteristics, may be the resulting products of the apparatus and method of the present invention. In addition, although twelve stages are shown in FIGS. 1A–1C and 3A–13C and described below, more or less stages may be used, depending on the application and their organization, and the present invention should not be limited to these twelve stages.

As explained above, each of the mold cores 82 has been numbered in the drawings with a "1," "2," "3," or "44," or a "1'," "2', " "3'," or "4'." For ease of reference, only the first four mold cores 1–4 will be discussed in detail below, since the second four mold cores 1'–4' are identical to, and operate the same as, the first four mold cores 1–4. Each of the first four mold cores 1–4 will be referred to hereinafter as "mold core 1," "mold core 2," "mold core 3" and "mold core 4," respectively. It should also be understood, that while only eight mold cores are shown in FIGS. 1A–1C and 3A–13C, and only the first four mold cores are discussed in detail below, the steps and movements of the depicted and discussed mold cores will preferably translate to any other similarly situated mold cores of the injection molding apparatus not shown or specifically discussed.

Referring to FIG. 1A–1C, stage 1 begins with the injection molding apparatus in a closed position (i.e., closed) and the mold cores in an X position, wherein mold core 1 and mold core 3 are each positioned within a seal liner cavity chamber, and mold core 2 and mold core 4 are each positioned within a shell cavity chamber. As a result, seal liner cavity openings are formed by mold core 1 and mold core 3, while shell cavity openings are formed by mold core 2 and mold core 4. A first material, preferably a seal liner material, such as santoprene, is then injected from the offset nozzles into the seal liner cavity openings formed by mold core 1 and mold core 3. Simultaneously therewith, a second material, preferably a shell material, such as polypropylene, is injected from the center nozzles into the shell cavity openings formed by mold core 2 and mold core 4. In stage 1, however, there is no seal liner material on mold core 2 or mold core 4, and the seal liner portions of these mold cores are also filled with shell material.

After hold pressure and cooling is complete for the seal liner and shell components on the mold cores, the injection molding apparatus is switched to the open position (i.e., opened) in stage 2, which is shown in FIGS. 3A–3C. A minimum hold pressure and cooling time is preferably allowed for these molded components to permit their clean removal from the cavities and mold cores. The hold pressure and cooling times suitable for the present invention depend on the materials used, as well as manufacturing and/or consumer preferences.

As shown in FIGS. 4A–4C, in stage 3, the shell components on mold core 2 and mold core 4 are stripped and removed from their mold cores by the forward movement (i.e., toward the nozzles) of the stripper plate, and thereby ejected from the injection molding apparatus. Since the shell components on mold core 2 and mold core 4 lack seal liner components, however, the ejected shell components from stage 3 are preferably discarded. In contrast, it should be understood that the seal liner components on mold core 1 and mold core 3 are not removed by the stripper plate from their mold cores or ejected from the injection molding apparatus, due to the positioning of the seal liner components in the seal liner portions of the mold core ends.

Figure 6B:
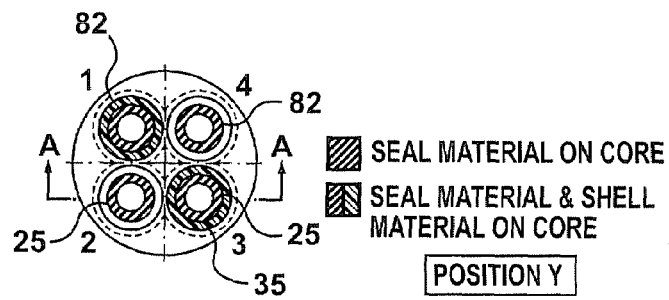
Figure 6C:
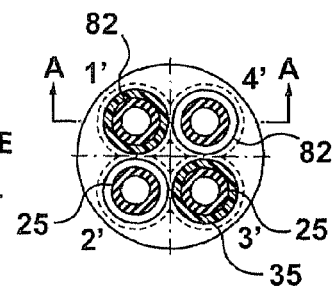

With the stripper plate held in the forward position, the core holders and mold cores are rotated clockwise ninety degrees to position Y in stage 4 by the driven racks and gears, as shown in FIGS. 5A–5C. As a result, mold core 1 and mold core 3 are aligned with the shell cavity chambers, while empty mold core 2 and mold core 4 are aligned with the seal liner cavity chambers. As shown in FIGS. 6A–6C, the stripper plate is returned back to its original position and the injection molding apparatus is closed in stage 5, with mold core 1 and mold core 3 each being positioned within a shell cavity chamber to form a shell cavity opening, and mold core 2 and mold core 4 each being positioned within a seal liner cavity chamber to form a seal liner cavity opening. A first material, preferably a seal liner material, such as santoprene, is then injected from the offset nozzles into the seal liner cavity openings formed by mold core 2 and mold core 4. Simultaneously therewith, a second material, preferably a shell material, such as polypropylene, is injected from the center nozzles into the shell cavity openings formed by mold core 1 and mold core 3. Unlike stage 1, however, there is seal liner material on mold core 1 and mold core 3, and the shell material is injected into the shell portions of these mold cores over, around, and on top of the seal liner material in the seal liner portions of these mold cores.

Figure 7A:
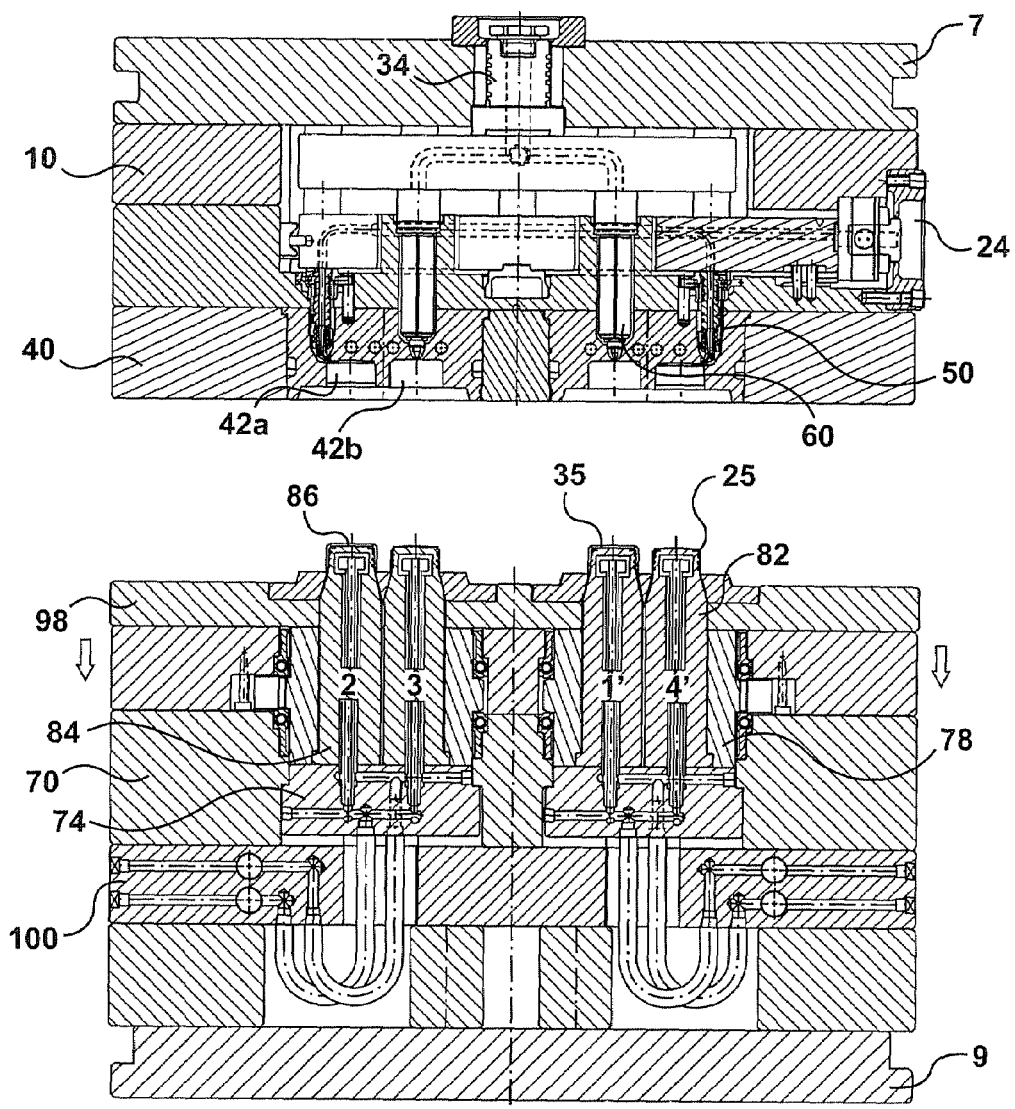
FIGS. 7A–7C (Stage 6) are a cross-sectional side view of the injection molding apparatus of FIG. 1A, and partial top views of the mold cores of the injection molding apparatus of FIG. 7A, respectively, with the mold cores shown in FIG. 7A being indicated by the A—A lines of FIGS. 7B–7C.
Figure 7B:
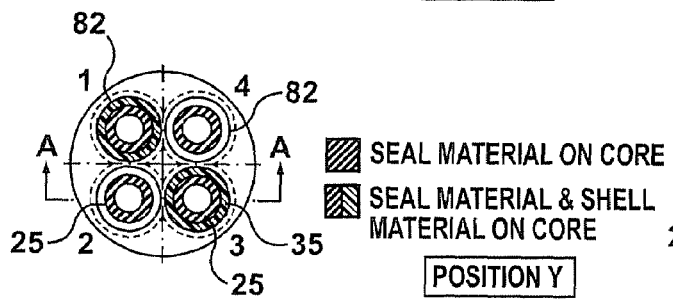
Figure 7C:
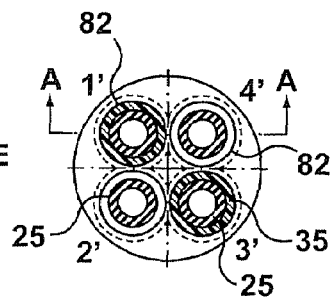
Figure 8A:
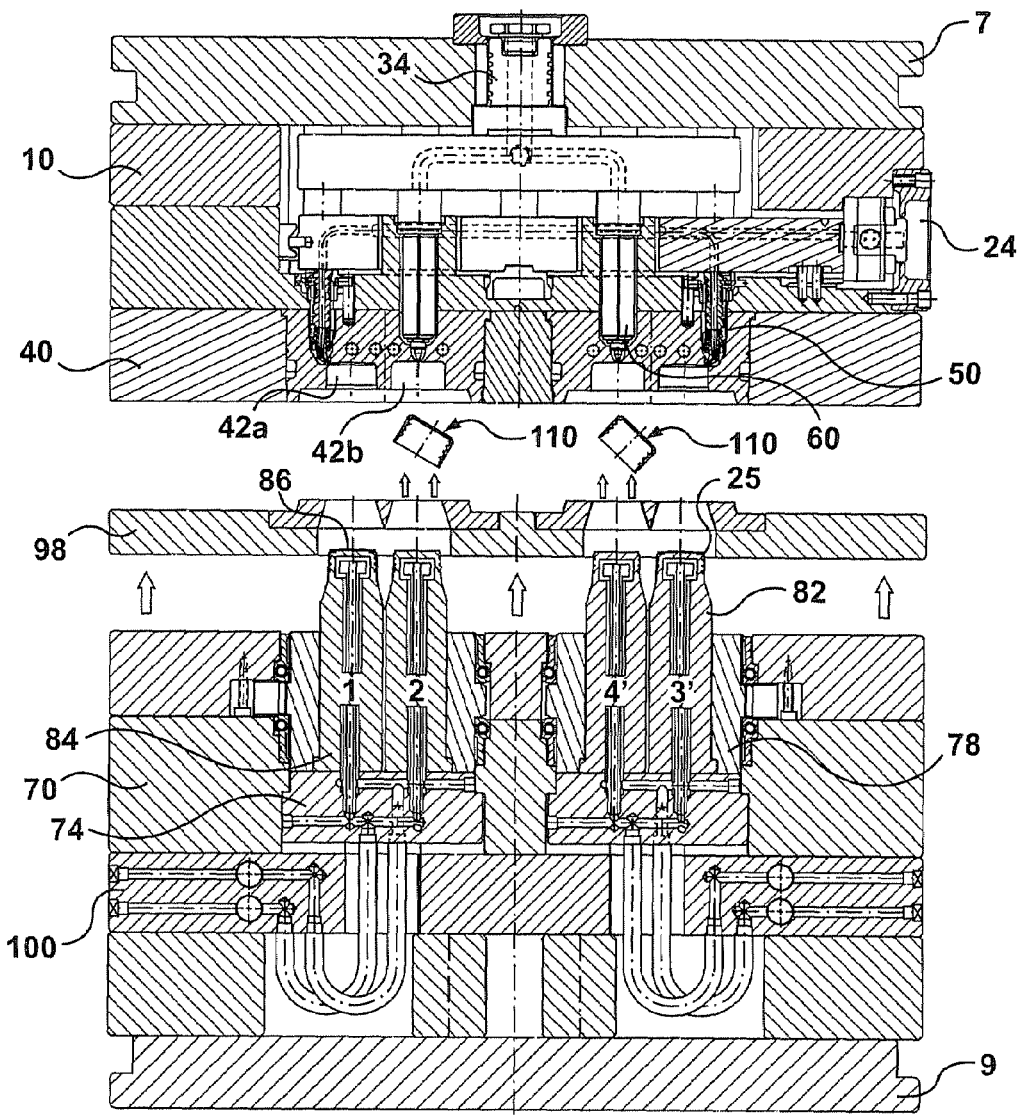
FIGS. 8A–8C (Stage 7) are a cross-sectional side view of the injection molding apparatus of FIG. 1A, and partial top views of the mold cores of the injection molding apparatus of FIG. 8A, respectively, with the mold cores shown in FIG. 8A being indicated by the A—A lines of FIGS. 8B–8C.
Figures 8B, 8C:
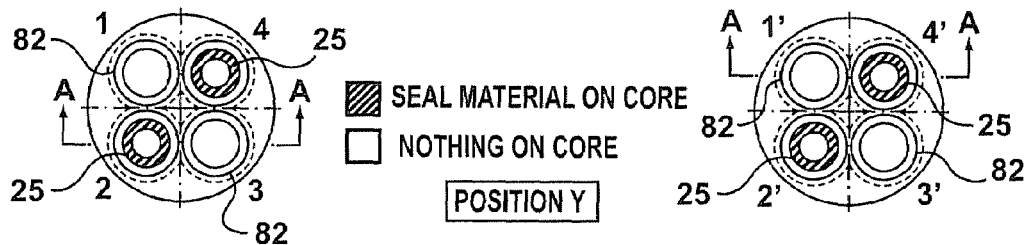
Figure 14A:
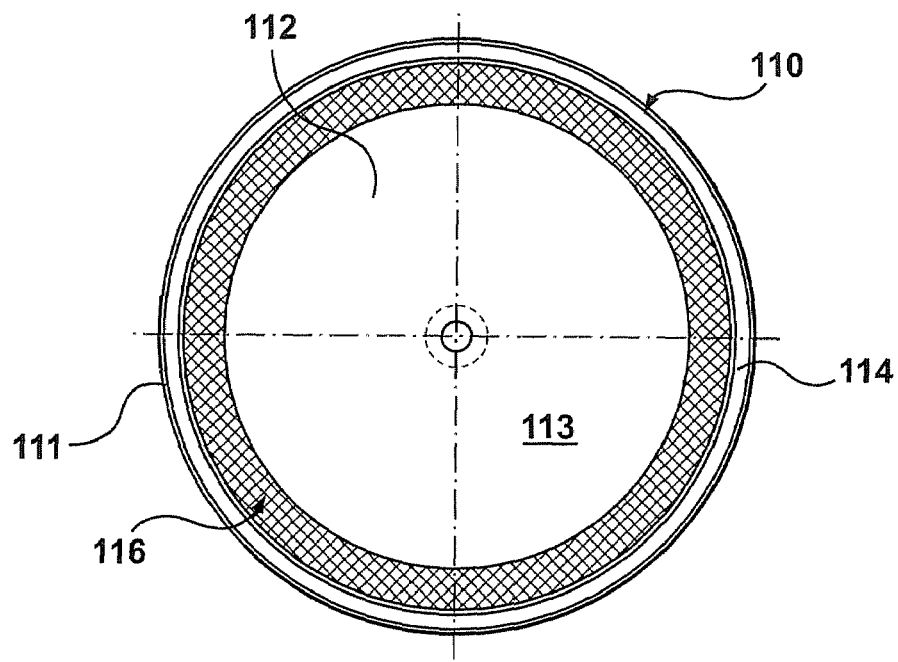
FIGS. 14A–14B are a bottom view and a partial cross-section side view of a closure formed by the exemplary injection molding apparatus and method described and shown herein.
Figure 14B:
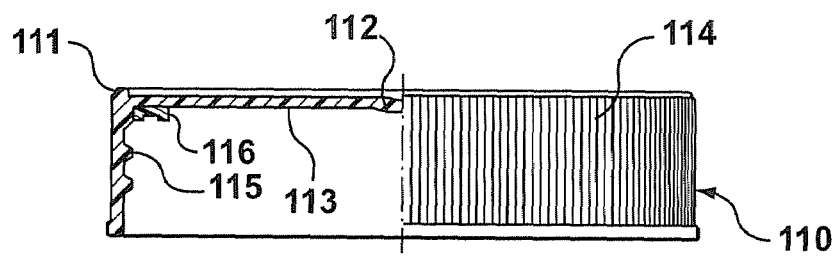
Figure 14C:
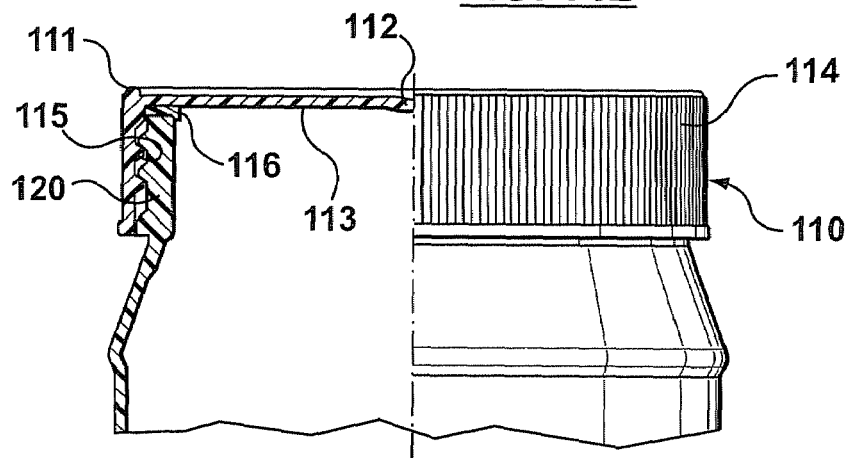
FIG. 14C is a partial cross-section side view of the closure of FIGS. 14A–14B positioned on a bottle end.

Similar to stage 2, after hold pressure and cooling is complete for the seal liner and shell components on the mold cores, the injection molding apparatus is opened in stage 6, which is shown in FIGS. 7A–7C. The process continues in stage 7 with the molded seal liner and shell components being stripped and removed from mold core 1 and mold core 3 by the forward movement of the stripper plate, and ejected from the injection molding apparatus, as shown in FIGS. 8A–8C. The molded product removed from these mold cores by the stripper plate is an integral, one-piece seal liner and shell component closure, which is shown in FIGS. 14A–14C and described in detail below. Similar to stage 3, the seal liner components on mold core 2 and mold core 4 are not removed by the stripper plate from their mold cores or ejected from the injection molding apparatus.

Figure 9A:
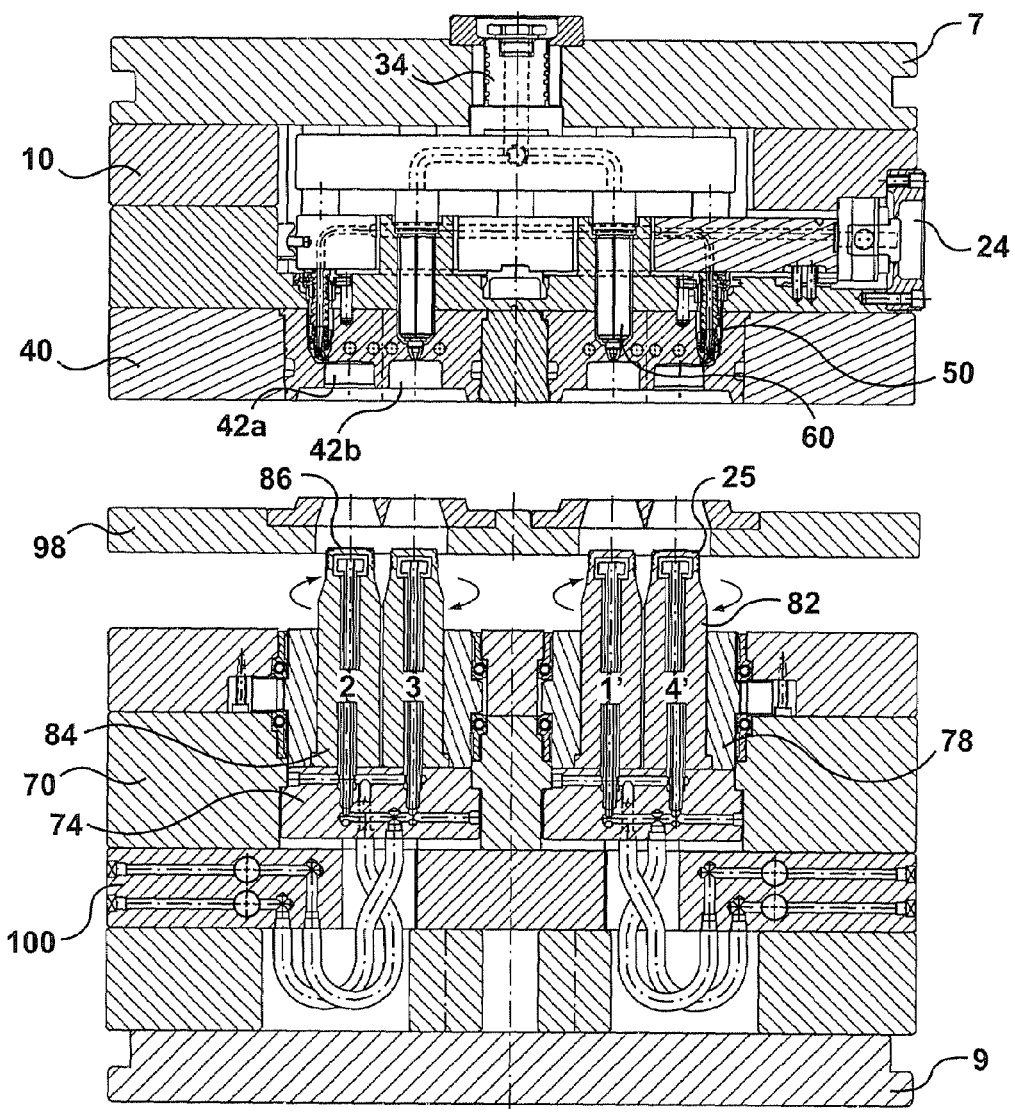
FIGS. 9A–9C (Stage 8) are a cross-sectional side view of the injection molding apparatus of FIG. 1A, and partial top views of the mold cores of the injection molding apparatus of FIG. is 9A, respectively, with the mold cores shown in FIG. 9A being indicated by the A—A lines of FIGS. 9B–9C.
Figure 9B:
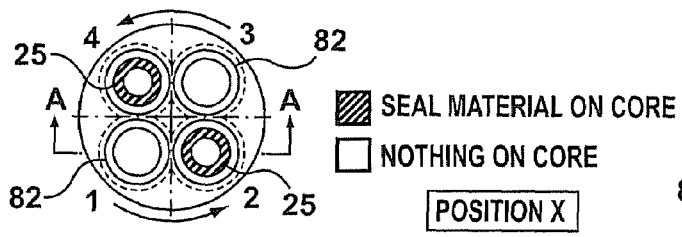
Figure 9C:
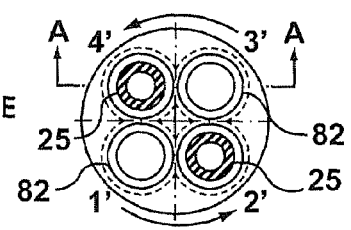
Figure 10A:
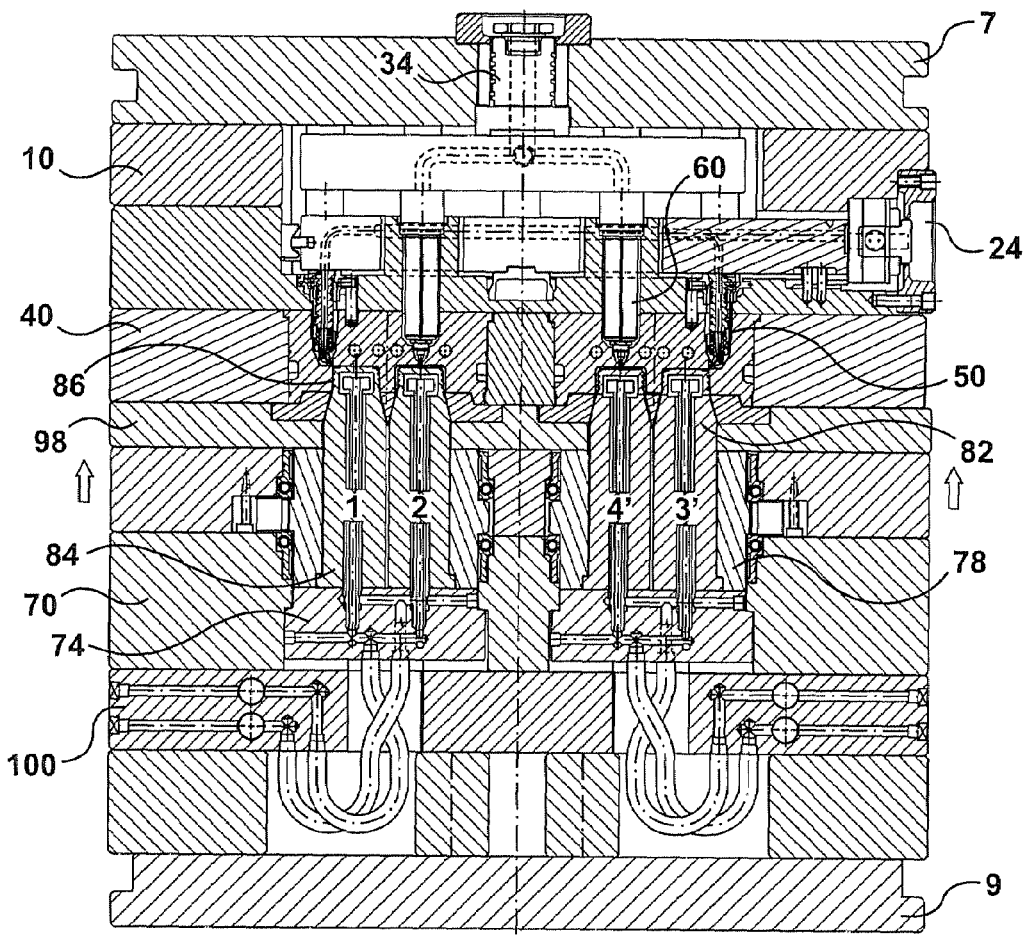
FIGS. 10A–10C (Stage 9) are a cross-sectional side view of the injection molding apparatus of FIG. 1A, and partial top views of the mold cores of the injection molding apparatus of FIG. 10A, respectively, with the mold cores shown in FIG. 10A being indicated by the A—A lines of FIGS. 10B–10C.
Figure 10B:
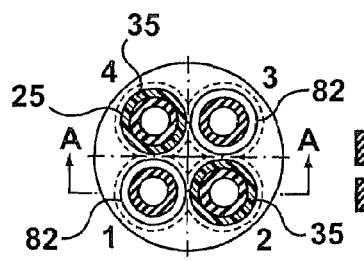
Figure 10C:
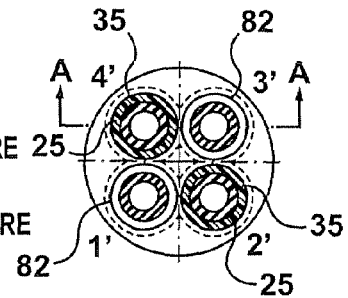

With the stripper plate in its forward position, the mold cores are rotated counterclockwise ninety degrees back to position X in stage 8 by the driven racks and gears, as shown in FIGS. 9A–9C. As a result, empty mold core 1 and mold core 3 are aligned with the seal liner cavity chambers, while mold core 2 and mold core 4 are aligned with the shell cavity chambers. As shown in FIGS. 10A–10C, the stripper plate is returned back to its original position and the injection molding apparatus is closed in stage 9, with mold core 1 and mold core 3 each being positioned within a seal liner cavity chamber to form a seal liner cavity opening, and mold core 2 and mold core 4 each being positioned within a shell cavity chamber to form a shell cavity opening. A first material, preferably a seal liner material, such as santoprene, is then injected from the offset nozzles into the seal liner cavity openings formed by mold core 1 and mold core 3. Simultaneously therewith, a second material, preferably a shell material, such as polypropylene, is injected from the center nozzles into the shell cavity openings formed by mold core 2 and mold core 4. Similar to stage 5 and unlike stage 1, there is seal liner material on mold core 2 and mold core 4, and the shell material is injected into the shell portions of these mold cores over, around, and on top of the seal liner material in the seal liner portions of these mold cores.

Figure 11A:
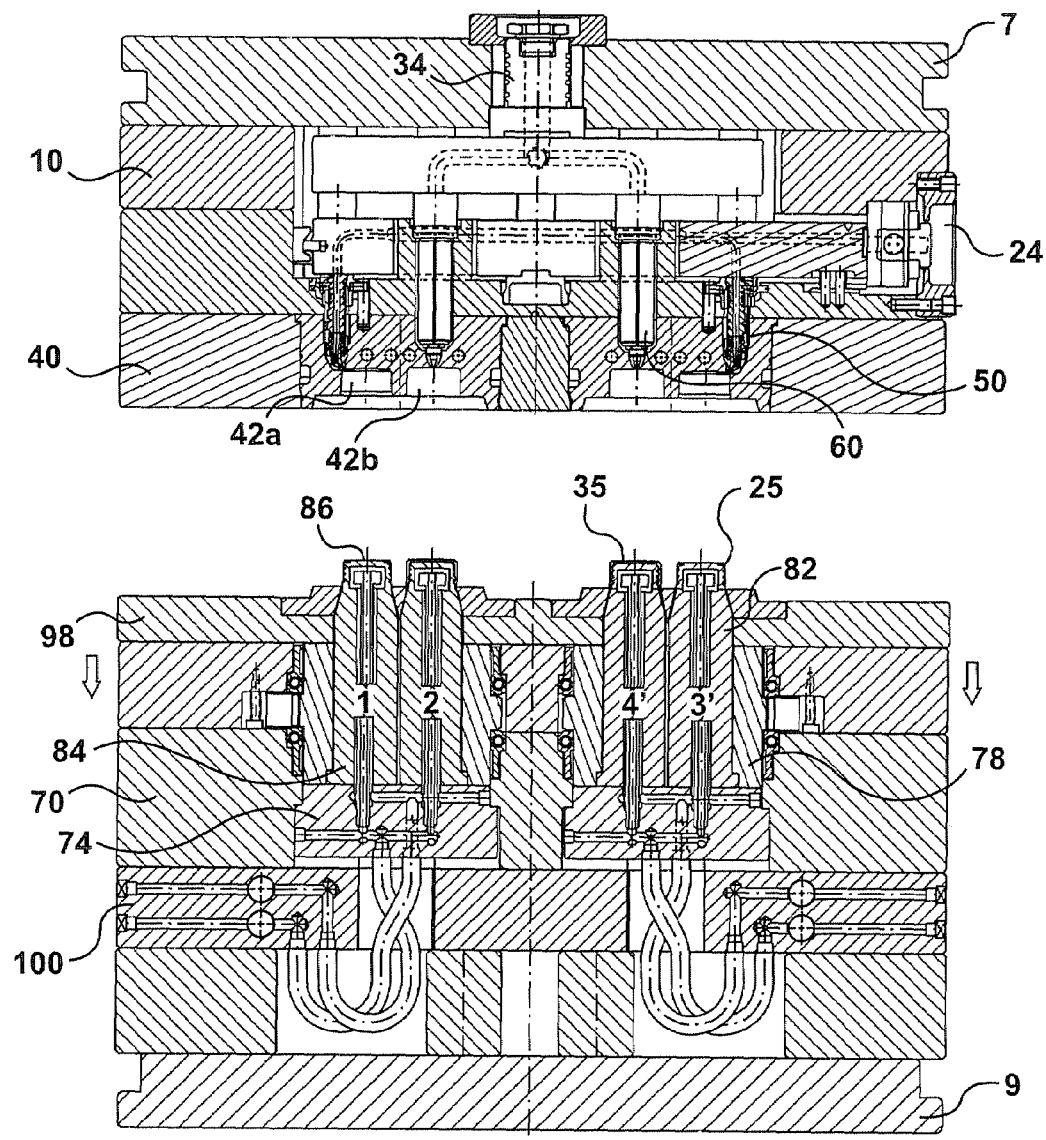
FIGS. 11A–11C (Stage 10) are a cross-sectional side view of the injection molding apparatus of FIG. 1A, and partial top views of the mold cores of the injection molding apparatus of FIG. 11A, respectively, with the mold cores shown in FIG. 11A being indicated by the A—A lines of FIGS. 11B–11C.
Figure 11B:
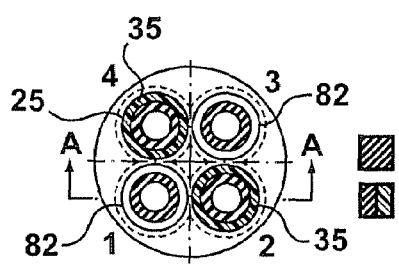
Figure 11C:
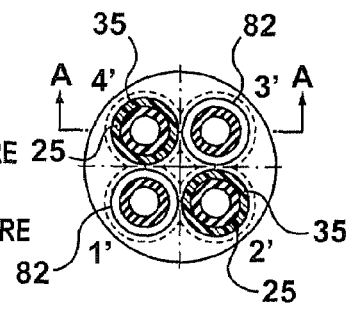

Similar to stages 2 and 6, after hold pressure and cooling is complete for the seal liner and shell components on the mold cores, the injection molding apparatus is opened in stage 10, which is shown in FIGS. 11A–11C. The process continues in stage 11 with the molded seal liner and shell components being stripped and removed from mold core 2 and mold core 4 by the forward movement of the stripper plate, and ejected from the injection molding apparatus, as shown in FIGS. 12A–12C. The molded product removed from these mold cores by the stripper plate is an integral, one-piece seal liner and shell component closure, which is shown in FIGS. 14A–14C and described in detail below. Similar to stages 3 and 7, the seal liner components on mold core 1 and mold core 3 are not removed by the stripper plate from their mold cores or ejected from the injection molding apparatus.

With the stripper plate in its forward position, the mold cores are rotated once again clockwise ninety degrees to position Y in stage 12 by the driven racks and gears, as shown in FIGS. 13A–13C. As a result, mold core 1 and mold core 3 are aligned with the shell cavity chambers, while empty mold core 2 and mold core 4 are aligned with the seal liner cavity chambers. Stage 12 completes one cycle of the injection molding method of the present invention. The method and operation of the injection molding apparatus of the present invention may continue, and run continuously, by returning to stage 5 each time after stage 12 is completed. It should be understood that stage 1 through stage 4 are preferably only implemented upon initial start up of the injection molding apparatus and method of the present invention, with continuous operation and molding only involves stage 5 through stage 12.

FIGS. 14A–14C illustrate a preferred embodiment of a closure 110 formed by stage 5 through stage 12 of the previously described method of the present invention. The closure 110 comprises a shell 111 having a base 112 with an inner surface 113, and an annular flange 114 extending outwardly from the base 112. Preferably, but not necessarily, the annular flange has interior threads 115. The closure 110 also comprises a ring-like seal liner 116 integrally molded to the inner surface 113 of the base 112 of the shell 111. The shell 111 and the seal liner 116 together form an integrally molded, one-piece closure. FIG. 14C shows this closure 110 in use with a typical open bottle end 120.

Although not explicitly set forth in detail above or shown in the drawings, several variations of and modifications to the present injection molding apparatus and method are possible without departing from the spirit of the invention. For instance, the mold cores themselves may be capable of rotation within their respective core holders to facilitate an easier ejection (in combination with the forward movement of the stripper plate) of threaded molded closures from the mold cores. In addition, the mold cores may be moved between the seal liner and shell cavity chambers in other ways than described above. For example, the mold cores may be mounted on a rotating core plate, instead of individual rotating core holders, that is capable of moving the mold cores between cavity chambers. Alternatively, the mold cores may be mounted and rotated between cavity openings on a turret, or the mold cores may be laterally shuttled back and forth between cavity chambers with a shuttle plate system. For more information on rotating core plates, mold core turrets, and shuttle plate systems, see U.S. Pat. Nos. 5,589,130, 6,322,738, and 6,398,537, all of which are specifically incorporated in their entirety herein by reference.

It should be readily apparent from the foregoing description and accompanying drawings that the injection molding apparatus and method of the present invention are an improvement over the prior art. For instance, the apparatus and method of the present invention provide an injection molding process for integral seal liner and shell component closures that eliminates the added labor and expense of separately adding seal liners to closure shells after the shells have been formed. This also reduces product handling of the seal liner and shell components, and thus reduces possible product contamination. In addition, the integral seal liner and shell components formed by the apparatus and method of the present invention provide closures with better sealing characteristics than the two-piece, separate-component closures of the prior art. Furthermore, with both the seal liner and shell components being injection molded together simultaneously with the present invention to form an integral closure, cycle or production times are reduced and less floor space and storage is needed compared to the prior art for secondary equipment, such as stamping machines for assembling the two-piece, separate-component closures of the prior art, and for raw stock materials (i.e., seal liners). Moreover, the injection molding apparatus of the present invention can be readily implemented into standard injection molding apparatus, as opposed to specially designed injection molding apparatus. Indeed, multiple separate manifolds and materials, as well as temperature and color variations, may be used with the present invention. As a result, the apparatus and method of the present invention may also be applied with particular advantage to existing injection molding apparatus.

Those skilled in the art to which the invention pertains may make modifications in other embodiments employing the principles of this invention without departing from its spirit or essential characteristics, particularly upon considering the foregoing teachings. Accordingly, the described embodiments are to be considered in all respects only as illustrative, and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An injection molding apparatus for molding products comprising:
   a first cavity chamber for forming a seal liner, the first cavity chamber having an outer edge;
   a second cavity chamber for forming a shell, the second cavity chamber being positioned adjacent to the first cavity chamber, the second cavity chamber having a center;
   a first nozzle for a seal liner material positioned near the outer edge of the first cavity chamber, the first nozzle being in direct communication with the first cavity chamber;
   a second nozzle for a shell material positioned near the center of the second cavity chamber, the second nozzle being in direct communication with the second cavity chamber; and
   a mold core positioned in and moved between the first and second cavity chambers.

2. The injection molding apparatus of claim 1 wherein the mold core is rotationally moved between the first and second cavity chambers.

3. The injection molding apparatus of claim 1 further comprising a stripper plate positioned around the mold core for removing shells from the mold core.

4. The injection molding apparatus of claim 1 wherein the mold core has an end opposite a base, the end having a seal liner portion for forming a seal liner cavity opening with the first cavity chamber, and a shell portion for forming a shell cavity opening with the second cavity chamber.

5. The injection molding apparatus of claim 1 wherein the first nozzle is connected to and in communication with a first melt distribution manifold, and the second nozzle is connected to and in communication with a second melt distribution manifold.

6. The injection molding apparatus of claim 1 wherein the seal liner material and the shell material comprises two different materials.

7. The injection molding apparatus of claim 6 wherein the seal liner material comprises santoprene, and the shell material comprises polypropylene.

8. The injection molding apparatus of claim 1 wherein the first nozzle has a body and a tip, the tip being angled relative to the body of the nozzle.

9. The injection molding apparatus of claim 1 wherein the first nozzle is thermal-gated at the first cavity and the second nozzle is valve-gated at the second cavity.

10. An injection molding apparatus for molding products comprising:
- a first and a second seal liner cavity chamber for forming a seal liner, the first and second seal liner cavity chambers each having an outer edge;
- a first and a second shell cavity chamber for forming a shell over the seal liner, the first shell cavity chamber being adjacent to the first seal liner cavity chamber, the second shell cavity chamber being adjacent to the second seal liner cavity chamber, the first and second shell cavity chambers each having a center;
- a first and a second offset nozzle for a seal liner material, the first offset nozzle being positioned near the outer edge of the first seal liner cavity chamber, the first offset nozzle also being in communication with the first seal liner cavity chamber, the second offset nozzle positioned near the outer edge of the second seal liner cavity chamber, the second offset nozzle also being in communication with the second seal liner cavity chamber;
- a first and a second center nozzle for a shell material, the first center nozzle being positioned near the center of the first shell cavity chamber, the first center nozzle also being in communication with the first shell cavity chamber, the second center nozzle positioned near the center of the second shell cavity chamber, the second center nozzle also being in communication with the second shell cavity chamber; and
- a first, a second, a third, and a fourth mold core, the first mold core capable of being positioned in and moved between the first seal liner cavity chamber and the second shell cavity chamber, the second mold core capable of being positioned in and moved between the first shell cavity chamber and the first seal liner cavity chamber, the third mold core capable of being positioned in and moved between the second seal liner cavity chamber and the first shell cavity chamber, and the fourth mold core capable of being positioned in and moved between the second shell cavity chamber and the second seal liner cavity chamber.

11. The injection molding apparatus of claim 10 wherein each mold core is rotationally moved between the cavity chambers.

12. The injection molding apparatus of claim 10 further comprising a stripper plate positioned around the mold core for removing shells from the mold core.

13. The injection molding apparatus of claim 10 wherein each mold core has an end opposite a base, the end having a seal liner portion for forming a seal liner cavity opening with the first cavity chamber, and a shell portion for forming a shell cavity opening with the second cavity chamber.

14. The injection molding apparatus of claim 10 wherein the first and second offset nozzles are connected to and in communication with a first melt distribution manifold, and the first and second center nozzles are connected to and in communication with a second melt distribution manifold.

15. The injection molding apparatus of claim 10 wherein the seal liner material and the shell material comprises two different materials.

16. The injection molding apparatus of claim 15 wherein the seal liner material comprises santoprene, and the shell material comprises polypropylene.

17. The injection molding apparatus of claim 10 wherein the first and second offset nozzles each have a body and a tip, the tip being angled relative to the body of the nozzle.

18. The injection molding apparatus of claim 10 wherein the first and second offset nozzles are thermal-gated at the first cavity, and the first and second center nozzles are valve-gated at the second cavity.

19. The injection molding apparatus of claim 10 wherein seal liners are formed on the first and third mold cores at about the same time as shells are formed on the second and fourth mold cores, and seal liners are formed on the second and fourth mold cores at about the same time as shells are formed on the first and third mold cores.

20. In combination with an injection molding machine having at least a first material and a second material, an injection molding apparatus comprising:
- a first cavity chamber for forming a seal liner, the first cavity chamber having an outer edge and a center;
- a second cavity chamber for forming a shell, the second cavity chamber being adjacent to the first cavity chamber, the second cavity chamber having a center;
- a first melt distribution manifold having a first material melt passage connected to and in communication with a first material injection entry, the first material injection entry being connected to and in communication with the first material of the injection molding machine;
- a second melt distribution manifold having a second material melt passage connected to and in communication with a second material injection entry, the second material injection entry being connected to and in communication with the second material of the injection molding machine;
- a first nozzle positioned near the outer edge of the first cavity chamber and offset from the center of the first cavity chamber, the first nozzle being in direct communication with the first cavity chamber and the first material melt passage;
- a second nozzle positioned near the center of the second cavity chamber, the second nozzle being in direct communication with the second cavity chamber and the second material melt passage; and
- a mold core positioned in and moved rotationally between the first and second cavity chambers.

* * * * *